(12) United States Patent
Berry, Jr. et al.

(10) Patent No.: US 8,676,390 B2
(45) Date of Patent: Mar. 18, 2014

(54) UNIVERSAL REMOTE MACHINERY CONTROLLER AND MONITOR

(76) Inventors: Robert Joseph Berry, Jr., Stanhope, NJ (US); Robert Joseph Berry, Sr., Morris Plains, NJ (US)

( * ) Notice: Subject to any disclaimer, the term of this patent is extended or adjusted under 35 U.S.C. 154(b) by 408 days.

(21) Appl. No.: 12/712,361

(22) Filed: Feb. 25, 2010

(65) Prior Publication Data
US 2010/0217406 A1   Aug. 26, 2010

Related U.S. Application Data

(60) Provisional application No. 61/155,376, filed on Feb. 25, 2009.

(51) Int. Cl.
G05D 3/12 (2006.01)
G05B 19/18 (2006.01)

(52) U.S. Cl.
USPC ........ 700/287; 700/3; 700/9; 700/20; 700/80; 700/82

(58) Field of Classification Search
USPC ............. 700/3, 4, 9, 20, 80, 82, 96, 169, 201, 700/275, 276, 277, 282, 284, 287, 297
See application file for complete search history.

(56) References Cited

U.S. PATENT DOCUMENTS

| | | | |
|---|---|---|---|
| 4,347,564 A * | 8/1982 | Sugano et al. | 700/3 |
| 4,689,752 A | 8/1987 | Fernandes et al. | |
| 4,821,027 A * | 4/1989 | Mallory et al. | 340/521 |
| 4,916,628 A | 4/1990 | Kugler | |
| 5,029,290 A * | 7/1991 | Parsons et al. | 340/533 |
| 5,172,093 A * | 12/1992 | Nose et al. | 340/426.27 |
| 5,731,688 A | 3/1998 | Thomson | |
| 5,734,255 A | 3/1998 | Thompson et al. | |
| 5,754,033 A | 5/1998 | Thomson | |
| 5,945,993 A * | 8/1999 | Fleischmann | 715/771 |
| 5,973,481 A | 10/1999 | Thompson et al. | |
| 6,631,310 B1 | 10/2003 | Leslie | |
| 6,653,821 B2 | 11/2003 | Kern et al. | |
| 6,668,629 B1 | 12/2003 | Leslie | |
| 6,845,301 B2 | 1/2005 | Hamamatsu et al. | |
| 6,851,621 B1 * | 2/2005 | Wacker et al. | 236/51 |
| 6,882,904 B1 | 4/2005 | Petrie et al. | |
| 6,912,889 B2 | 7/2005 | Staphanos et al. | |
| 6,983,640 B1 | 1/2006 | Staphanos et al. | |
| 7,005,997 B1 | 2/2006 | Wiewiura | |
| 7,010,467 B2 | 3/2006 | James | |
| 7,062,359 B2 | 6/2006 | Bjorklund | |
| 7,299,279 B2 | 11/2007 | Sadaghiany | |
| 7,369,057 B2 | 5/2008 | Twerdochlib et al. | |
| 7,394,395 B2 | 7/2008 | Sakatani et al. | |
| 7,702,939 B2 * | 4/2010 | Pan | 713/323 |
| 7,761,186 B2 * | 7/2010 | Keller et al. | 700/277 |
| 2006/0015195 A1 * | 1/2006 | Lehman et al. | 700/83 |
| 2007/0135971 A1 * | 6/2007 | Andarawis et al. | 700/292 |
| 2009/0184804 A1 * | 7/2009 | Seppa | 340/10.1 |

* cited by examiner

Primary Examiner — Sean Shechtman
(74) Attorney, Agent, or Firm — Hoffmann & Baron, LLP

(57) ABSTRACT

A system is provided herein for remotely controlling and monitoring machinery, the machinery having a control network for control thereof, one or more switches coupled to the control network for controlling the machinery via the control network. The system includes a controller hardwired coupled to the control network of the machinery. The controller is configured to control the machinery via the control network separately from the switches, and the controller is configured to monitor operation of the machinery. In addition, the system includes an arrangement for receiving signals for controlling the controller from a remote location and an arrangement for transmitting, to a remote location, information collected by the controller resulting from the controller monitoring operation of the machinery. Advantageously, with the subject invention, the system can control and monitor machinery from remote locations directly. In the event of faults or failures, corrective action may be taken using the subject invention.

14 Claims, 4 Drawing Sheets

UNIVERSAL REMOTE MACHINERY CONTROLLER AND MONITOR

CROSS-REFERENCE TO RELATED APPLICATION

This application claims priority to U.S. Provisional Patent Appl. No. 61/155,376, filed Feb. 25, 2009, the entire contents of which are hereby incorporated by reference.

BACKGROUND OF THE INVENTION

This invention relates to remote controlling and monitoring of machinery.

Machinery, particularly heavy machinery, may be located at various and remote locations far from a central organization or authority responsible for the machinery. Nonetheless, maintenance and monitoring of the machinery is continuously required. For example, electrical generators, which act as primary or back-up power supplies, require not only regular maintenance, but periodic start-ups to ensure proper operation. Such periodic start-ups may be mandated by law.

SUMMARY OF THE INVENTION

A system is provided herein for remotely controlling and monitoring machinery, the machinery having a control network for control thereof, one or more switches coupled to the control network for controlling the machinery via the control network. The system includes a controller hardwired coupled to the control network of the machinery. The controller is configured to control the machinery via the control network separately from the switches, and the controller is configured to monitor operation of the machinery. In addition, the system includes an arrangement for receiving signals for controlling the controller from a remote location and an arrangement for transmitting, to a remote location, information collected by the controller resulting from the controller monitoring operation of the machinery. Advantageously, with the subject invention, the system can control and monitor machinery from remote locations directly. In the event of faults or failures, corrective action may be taken using the subject invention.

These and other features of the invention will be better understood through a study of the following detailed description and accompanying drawings.

DETAILED DESCRIPTION OF THE INVENTION

Figure 1:
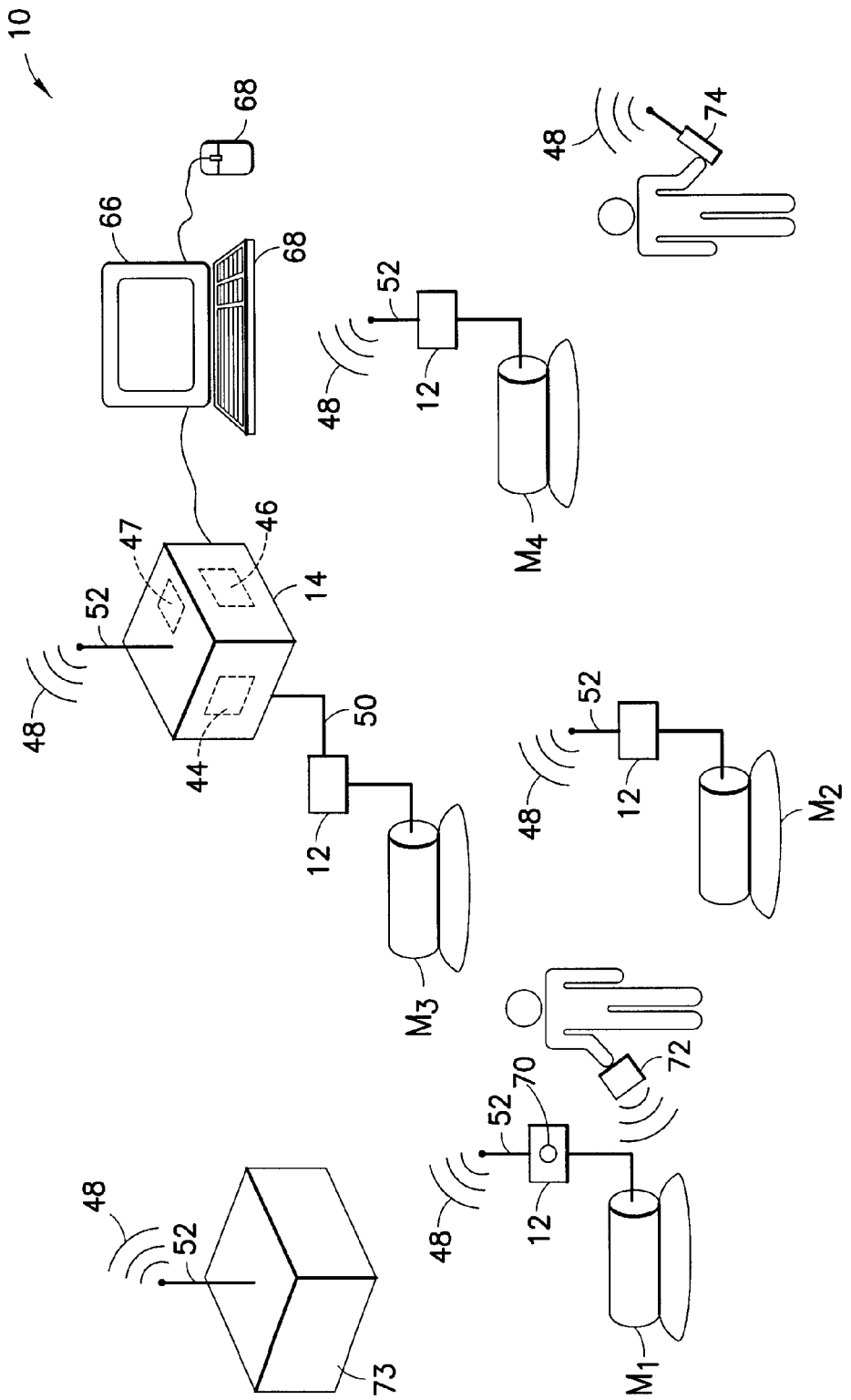
FIGS. 1-3 are schematics of a system, and components thereof, in accordance with the subject invention; and, FIG. 4 is a flowchart depicting possible operation of a system in accordance with the subject invention.
Figure 2:
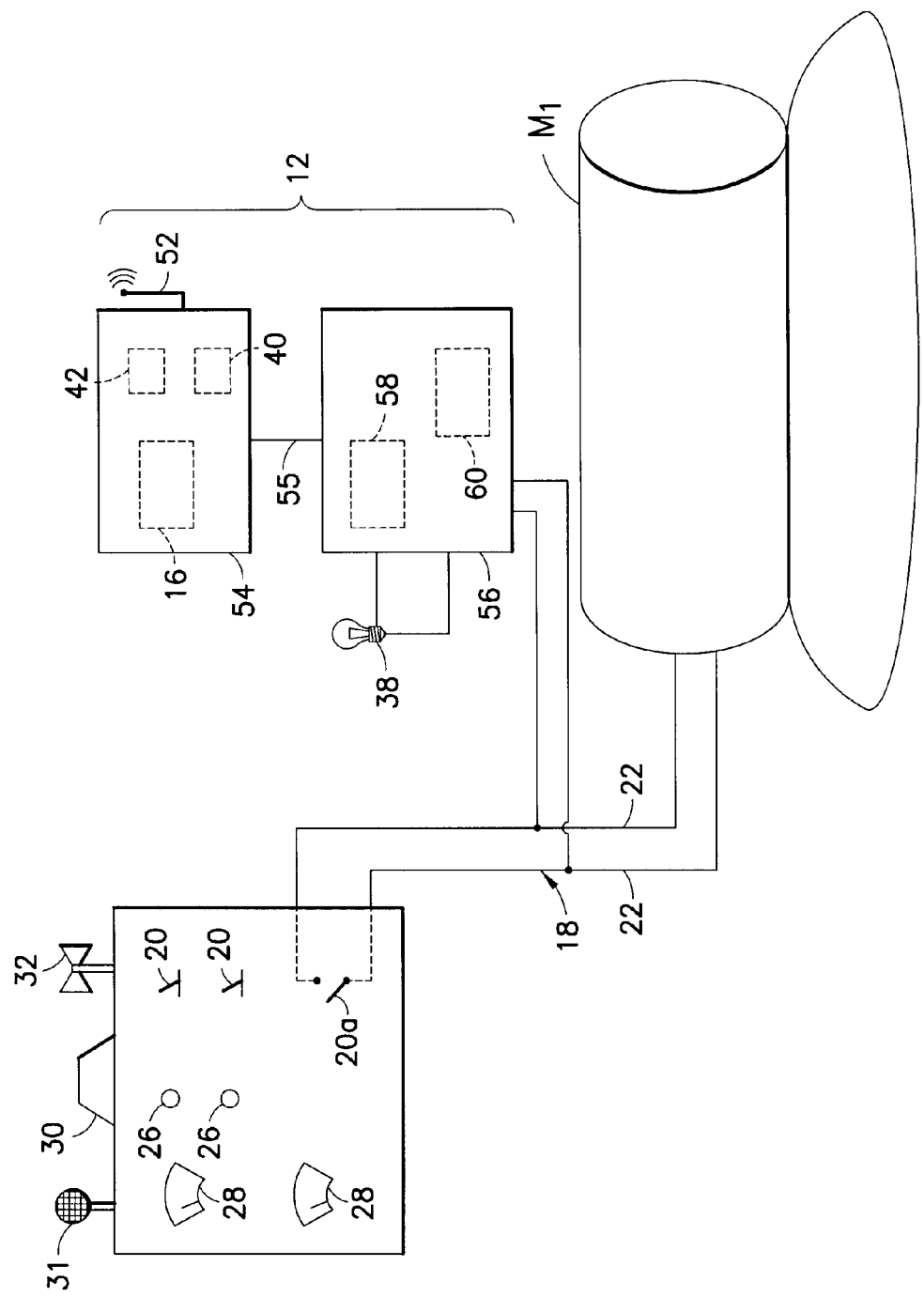

A system, generally depicted with the reference number 10, is provided herein which is capable of controlling and/or monitoring machinery from a remote location. The system is particularly well-suited for use with emergency generators, but can be used with other machinery, such as pumps (e.g., fire pumps, sewage pumps, etc.), compressors, turbines, water wells and tanks, HVAC heating systems and air conditioners, uninterruptible power supplies, battery chargers and batteries, battery-operated train gates, battery-operated emergency lights, security gates and entry alarms, alarm systems, permanently mounted refrigeration equipment, mobile refrigeration equipment and so forth. The system 10 can be used with various machinery, not limited to heavy machinery, and is intended to cover machines and systems which are continuously operating and/or maintained in stand-by operation ready for operation. The system 10 permits test start-ups and monitoring during normal operation and/or test runs. In addition to monitoring the operation of the machinery, the system can monitor ambient conditions or operational characteristics, such as various temperatures and electrical characteristics, such as output voltage.

With reference to the Figures, the system 10 generally includes one or more controllers 12 and a master server 14. The controllers 12 are located on-site at the locations of machinery to be controlled and/or monitored ($M_1$, $M_2$, $M_3$ ...). As discussed in more detail below, the controllers 12 are communicatively linked, such as by hard wiring and/or wireless, with the master server 14 which is located remotely from the machinery $M_1$-$M_3$.

The controllers 12 may be one or more components each provided in a single or multiple enclosures. Each of the controllers 12 includes a computer processing unit (CPU) 16 which is configured to receive and execute commands from the master server 14.

The machinery $M_1$-$M_3$ each includes a control network 18 configured for control of the corresponding piece of the machinery $M_1$-$M_3$ and related aspects. The control network 18 will include one or more switches 20 configured, such as by hard wired coupling through conductors 22, to operate the machinery $M_1$-$M_3$. The switches 20 may be configured to not only cause activation and deactivation of the machinery $M_1$-$M_3$, but also may cause control over other operating characteristics, such as placing the machinery $M_1$-$M_3$ into an automatic or stand-by state which is activated upon an occurring event. For example, the machinery $M_1$-$M_3$ may be in the form of a back-up generator, and the switches 20 may be placed into an automatic stand-by phase where the generator is caused to automatically activate when loss or reduction of power is detected.

The switches 20 may be located on a control panel 24 located at or in proximity to the corresponding piece of the machinery $M_1$-$M_3$. The control panel 24 may include, in addition to the switches 20, indicator lights 26, gauges 28, and one or more warning devices, such as siren 30, speaker 31 for broadcasting live or recorded messages (which may be in various languages) and/or horn 32.

Each of the controllers 12 is hard wire coupled to the control network 18 of the corresponding piece of the machinery $M_1$-$M_3$. The controller 12 is coupled so as to permit the controller 12 to control operation of the machinery $M_1$-$M_3$ separately from the switches 20. Any wiring configuration permitting parallel control with the switches 20 may be utilized. By way of non-limiting example, a starter relay 34 may be provided with each of the controllers 12 which is wired across on/off switch 20a which is the switch 20 for activating and deactivating the corresponding piece of the machinery $M_1$-$M_3$. With activation of the starter relay 34, the start circuit of the corresponding piece of the machinery $M_1$-$M_3$ may be closed within the control network 18, thus, causing activation. This activation is independent of the switch 20a. Deactivation of the starter relay 34 will result in corresponding deactivation of the corresponding piece of the machinery $M_1$-$M_3$. With this arrangement, the piece of the machinery $M_1$-$M_3$ may be caused to start from a remote location. In this manner, the piece of the machinery $M_1$-$M_3$ may be periodically tested to ensure proper operation.

The controller 12 may be provided with additional relays which may be coupled to the control network 18 for different purposes. For example, one or more secondary relays 36 may be provided to activate a light, such as one of the indicator lights 26 or a stand-alone light 38, for various purposes, such as impending start-up, service technician en route, etc. One or more of the secondary relays 36 may be also coupled to a warning device such as the siren 30, the speaker 31 or the horn 32, to notify of impending start-up or other indications. Further, one or more of the secondary relays 36 may be coupled to a reset circuit of the control network 18 such that, with activation of the corresponding secondary relays 36, the control network 18 and the corresponding piece of the machinery $M_1$-$M_3$ may be reset. With this configuration, upon failed start-up, remote reset may be initiated as an attempt to rectify any problems. The secondary relays 36 may be wired in parallel to portions of the control network 18 so as to independently control portions thereof. For example, the control network 18 may be configured to activate the indicator lights 26 independently of the controller 12 and vice versa. Activation and de-activation of the secondary relays 36 results in corresponding activation and de-activation of the corresponding aspects of the control network 18. The secondary relays 36 may be located in the controller 12 and/or on the control network 18 (e.g., in the control panel 24).

The controllers 12 each include a transmitter 40 and receiver 42. The transmitter 40 and the receiver 42 are configured to receive signals from, and transmit signals to, the master server 14. The transmitter 40 and the receiver 42 may be hard wired coupled or wirelessly coupled to the master server 14. Preferably, a wireless connection is utilized. The system 10 may utilize a wireless network between the controllers 12 and the master server 14, the wireless network being any of various wireless networks including an 802.11-compliant network, Bluetooth network, high speed circuit switched data (HSCSD) network, packet data cellular (PDC-P) network, general packet radio servers (GPRS) network, 1x radio transmission technology (1xRTT) network, IrDA network, multichannel multipoint distribution service (MMDS) network, local multipoint distribution service (LMDS) network, worldwide interoperability for microwave access (WiMAX) network, and/or any other network that communicates using a wireless protocol. The master server 14 includes a master transmitter 44 and master receiver 46 configured to communicate with the transmitters 40 and the receivers 42 of the controllers 12. The communication may be through signals 48 which may be transmitted wirelessly and/or through hard wired conductors 50.

The signals 48 may be generated by and transmitted from the master server 14 to the controllers 12 to cause control over the corresponding pieces of the machinery $M_1$-$M_3$. The signals 48 via the CPU's 16 of the controllers 12 cause activation or de-activation of the starter relay 34 and/or the secondary relays 36 as needed.

The transmitter 40 and the receiver 42 for each of the controllers 12 preferably is a single device such as a modem, wireless modem, and/or cellular transmitter (e.g., using any of the aforementioned wireless networks), but may be separate components. Likewise, the master transmitter 44 and the master receiver 46 preferably is a single device such as a modem, wireless modem and/or cellular transmitter (e.g., using any of the aforementioned wireless networks), but may be separate components. The master receiver 46 may also include a router 47 configured to intercept and queue the signals 48 from a plurality of the controllers 12. The router 47 may be further configured to transmit the signals 48 in an orderly sequence for further processing by the master server 14. The signals 48 may be converted into various forms at one or more locations in the system 10.

As is known in the art, the transmitters 40, the receivers 42, the master transmitter 44 and the master receiver 46 may be provided with antennas 52 to enhance signal transmission and reception. The controllers 12, as discussed above, may be provided in multiple components. The transmitter 40 and the receiver 42 of the controller 12 may be provided in a first enclosure 54 with other components of the controller 12, e.g., the starter relay 34, the secondary relays 36, and so forth, being provided in a second enclosure 56. With this arrangement, the first enclosure 54 may be located at an on-site location with better signal reception, for example, near a door in a plant, outside of a machine enclosure, outside of a control panel, etc. The second enclosure 56 may be located at or near the control network 18 of the corresponding piece of the machinery $M_1$-$M_3$, such as inside a machine enclosure, inside a control panel, etc. The first and second enclosures 54, 56 may be communicatively coupled through any known technique, such as by hard wiring or wireless. Preferably, the first and second enclosures 54, 56 are coupled together by a hard-wired connection 55, such as a I2C bus connector, or wireless connection, such as by wireless radios configured as an 802.15 compliant network (e.g., 802.15.4-2003), such as configured for ZigBee communication protocols.

The controllers 12 may each also include a module 58 configured to periodically monitor the corresponding piece of the machinery $M_1$-$M_3$. The module 58 may be a circuit board or other logic controller which may sense a fault in the operation of the machinery $M_1$-$M_3$. A timer 60, which may be provided in with each of the controllers 12 in hardware or software form, may be coupled with the module 58 to set predetermined intervals of time for signal detection. The module 58 may be configured to detect fault with change in condition or occurrence of event. For example, the module 58 may be configured to continuously monitor voltage at one or more locations in the control network 18 so as to compare with a threshold voltage amount or ground voltage.

Figure 3:
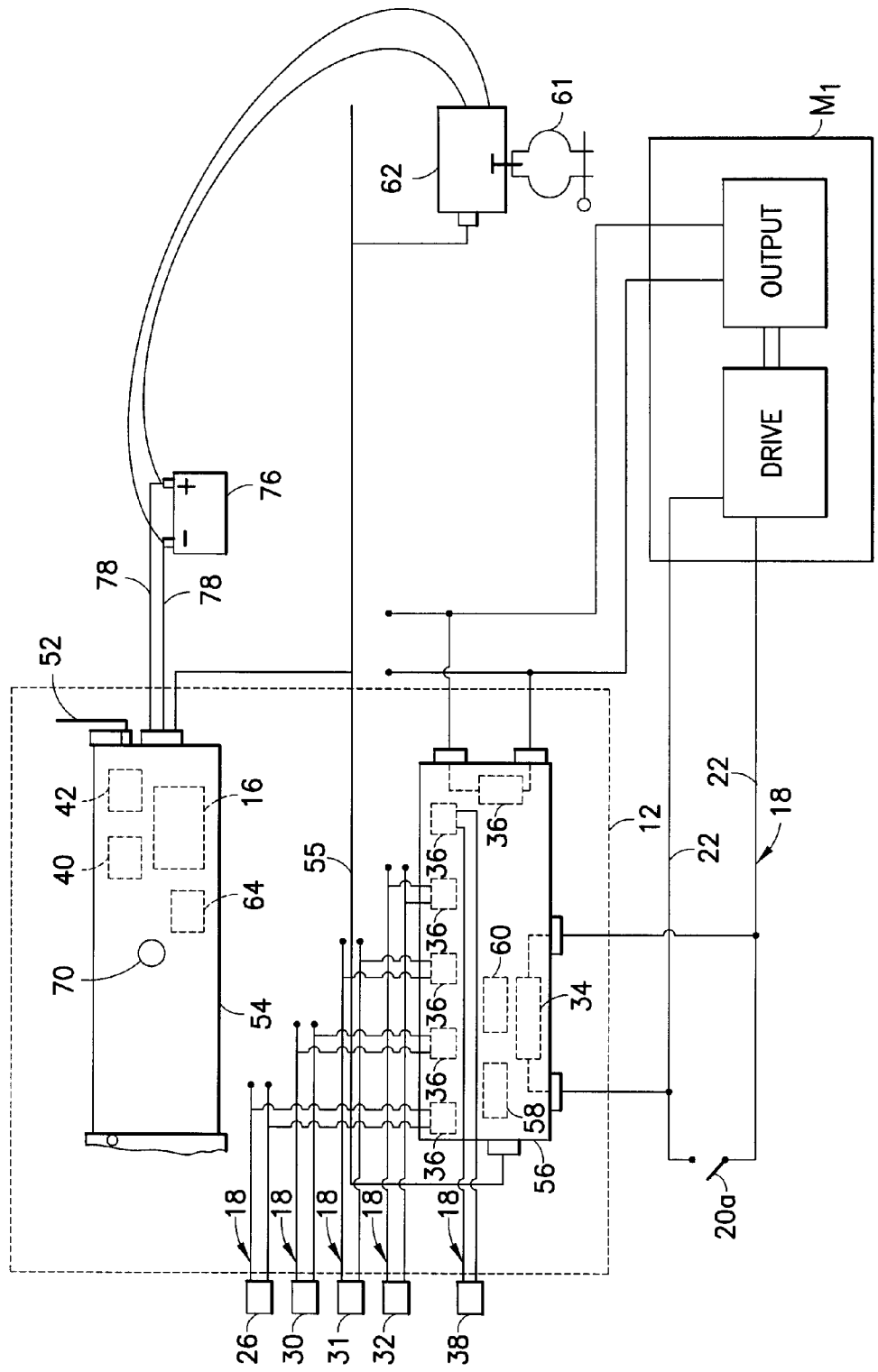

One or more of the secondary relays 36 may be coupled to an output or other aspect of the machinery $M_1$-$M_3$ to detect operation. For example, with the piece of the machinery $M_1$-$M_3$ being a generator, output voltage in excess of a threshold may cause an associated one of the secondary relays 36 to activate. Where the piece of machinery $M_1$-$M_3$ has a drive portion (e.g., an engine) and an output portion (e.g., an electrical generator) (FIG. 3), failure to detect output, after a remote start of the drive portion by the starter relay 34, may indicate a problem or fault. In such an event, the starter relay 34 may be de-activated to cause the drive portion to shut down. A subsequent attempt at reset and re-start may be tried.

The controllers 12 may also be coupled to one or more transducers 62 measuring operational characteristics of the machinery $M_1$-$M_3$. The transducers 62 may be used to measure temperature at one or more locations, such as jacket water hose temperature where the machinery $M_1$-$M_3$ is a generator. A clamp 61 may be provided to secure the transducer 62, or at least a portion thereof, as needed. As will be appreciated by those skilled in the art, other operational or ambient characteristics can be monitored, such as outside temperature, pressure, speed (e.g., RPM's), output (e.g., flow rate, electrical output), and so forth. Information collected by the transducers 62 may be transmitted by the transmitters 40 to the master server 14 directly, or via the CPU's 16 and/or the modules 58. The CPU's 16 may include a memory 64 (e.g., RAM) where collected information may be stored temporarily or permanently. Optionally, the collected information may be stored in the memories 64 for an interval of time and then transmitted to the master server 14. The timers 60 may be configured to have the CPU's 16, e.g., via the modules 58, request read-outs from the transducers 62 at predetermined intervals of time, such as hourly, daily, weekly, and so forth, readings. The collected information may be stored at the master server 14 and made available for viewing through a graphical user interface (GUI) 66 in any known form, including a monitor. One or more interfaces 68, such as a keyboard, mouse, touch pad, and so forth, may be provided with the master server 14 to permit control over the system 10, for example in causing one or more of the pieces of machinery $M_1$-$M_3$ to be selected and started for a test (e.g., by causing the master server 14 to generate the corresponding signal 48).

The controllers 12 may be each provided with a reader 70 configured to detect a unique signal. The unique signal may be generated by a signal device 72, which can be a handheld fob. The signal device 72 may be a direct contact transmitter (e.g., a direct contact transmitter sold under the trademark "iButton" by Dallas Semiconductor Corp. of Dallas, Tex.) or an RFID device. The controllers 12 may be configured such that with the reader 70 detecting a unique signal, the controllers 12 may be placed into a by-passed state whereby the controllers 12 are prevented from controlling the corresponding piece of the machinery $M_1$-$M_3$. A signal may be sent from the readers 70, upon detection of the unique signal, to the master server 14 so as to indicate that the corresponding controller 12 is in the by-passed state. The by-passed state permits maintenance of the corresponding piece of the machinery $M_1$-$M_3$, without the possibility of remote start-up by the controller 12. Maintenance personnel may be provided with the signal device 72 to permit selective by-pass as required. In the by-passed state, one or more of the indicator lights 26 may be activated so as to provide visual indication of the by-passed state. Activation of the indicator lights 26 may be accomplished by one or more of the secondary relays 36. Specifically, the relevant secondary relay(s) 36 may be caused to be activated to cause activation of the corresponding indicator light(s) 26. The controller 12 may be taken out of the by-passed state with the lapsing of a predetermined interval of time, which can be measured by the timer 60. The controller 12 may be configured so that a warning device, such as the siren 30, the speaker 31 or the horn 32, is activated within a predetermined interval of time prior to the lapsing of the by-passed state. This provides warning that the controller 12 will soon become fully active with the possibility of remote start-up. For example, the by-passed state may be set automatically to be two hours long, with a warning signal being activated at fifteen minutes prior to the end of the two-hour period.

The reader 70 may be also configured to detect a unique signal for service call purposes. The same or a different signal device 72 may be utilized where, upon detection of the unique signal, the reader 70 transmits a signal to the master server 14 indicating that a service call is requested. A switch may be provided on the signal device 72 to permit the signal device 72 to change the unique signal being emitted. In this manner, the signal device 72 may emit one signal for initiating by-pass and a second signal for calling for service. Alternatively, two of the signal devices 72, e.g., two fobs, may be provided each having a unique signal. The reader 70 may be configured to detect both unique signals and differentiate between them. To show that the request for service has been received, the master server 14 may transmit a signal to the controller 12 to activate one of the indicator lights 26 as an indication that a service technician is en route. The indicator light(s) 26 may be activated by one or more of the secondary relays 36. The service call signal will have associated therewith the corresponding piece of the machinery $M_1$-$M_3$. With receipt of the service call signal, an operator of the master server 14 may place a call, radio transmission or electronic message to a service technician, via a portable device 74, which may be a radio, cell phone or web-enabled device. In addition, or alternatively, the master server 14 may be configured to automatically generate an e-mail to the portable device 74 to request the service call. Details on the specific piece of machinery $M_1$-$M_3$, such as location and so forth, may be provided to the service technician.

Preferably, the controllers 12 are not sensitive to voltage and may be powered by electricity taken from the corresponding piece of machinery $M_1$-$M_3$, or its associated control network 18. For example, the corresponding piece of the machinery $M_1$-$M_3$ may include a battery 76 to which power conductors 78 from the controller 12 may be coupled. If the controller 12 is provided over multiple enclosures, such as the first and second enclosures 54, 56, it is preferred that power be transmitted therebetween.

As discussed above, the master server 14 may be coupled with the controllers 12 over a network. The network may be an isolated network such as a local area network (LAN) or a wide area network (WAN) and/or part of a global network, such as the Internet. Even as part of a global network, the system 10 may be isolated from other portions of the network, such as through firewalling or other security measures. The controllers 12 and the master server 14 may each be provided with a unique IP address to define the network. Software updates and other information may be transmitted from the master server 14 to the controllers 12 as needed over the network. Isolation of the controllers 12 and the master server 14 minimizes the ability of one to hack into the network and cause unwanted start-up or other deleterious activity. The master server 14 includes a computer processing unit (CPU) and a memory (e.g., RAM) which may be located on one or more devices.

The system 10 can be used to control one or more of the machines $M_1$-$M_3$ and/or to cause monitoring thereof. The system 10, through transmission of the signals 48 from the master server 14 to the controllers 12, may cause remote start-up and shut-down of the machinery $M_1$-$M_3$ individually for varying lengths of time. This permits remote control for testing and other evaluation of the machinery $M_1$-$M_3$. Warning signals, various aspects of the machinery $M_1$-$M_3$, and the corresponding control networks 18, may be likewise controlled by the master server 14 through transmission of the signals 48 to the controllers 12. The monitoring may be done continuously as described above. In addition, predetermined threshold values may be stored in the CPU 16 of each of the controllers 12 and/or the master server 14 which are compared to collected information from monitoring. In this manner, fault may be detected. For example, an acceptable temperature range may be set where, if a temperature is detected outside the range by one of the transducers 62, a fault is recognized. The master server 14 and/or the CPU 16 may conduct such comparisons in determining fault. If the CPU 16 detects the fault, a signal is transmitted to the master server 14. An operator of the master server 14 may then place a call or send an e-mail to the operator 73 of the corresponding piece of the machinery $M_1$-$M_3$ thereby providing notification of the fault. Alternatively, the master server 14 may be configured to automatically generate a fault notification e-mail. Correspondingly, if it is detected that the measured data falls within an acceptable range, notification can be provided of the fault being cleared. Thus, where a temperature is detected to be within range that had previously been outside of acceptable range, a notification, by phone or e-mail can be sent that this fault has been cleared. As will be appreciated, any mode of possible notification may be utilized, including, phone call, radio transmission, electronic messaging (e.g. e-mail), text message, on-line posting, and so forth.

The system 10 can be configured to provide notification of various faults, such as operational characteristics noted above. In addition, conditions of the control network 18 can be monitored with fault detection being provided therefor. Voltage, e.g., positive voltage, or ground signal may be utilized as an indicator of fault. For example, constant voltage or ground signal may be taken as an input to the module 58 and as an indicator of a normal state. For example, the switch 20a may be provided with three states, an on state, an off state and an automatic state. The automatic state may be used to put the corresponding piece of machinery $M_1$-$M_3$ into a stand-by state with the machine being caused to activate upon an occurrence of event, such as with a generator being activated with reduction or loss in power. The controllers 12 may be coupled to the control network 18 such that the state of the switch 20a is detected. A default state for the switch 20a may be defined, such as the automatic state. With the switch 20a being in the on state, and not in the automatic state, a fault may be detected with notification being provided thereof. As will be recognized by those skilled in the art, the controller 12 may be configured to simultaneously monitor a number of characteristics for fault detection purposes, e.g., through a plurality of the transducers 62 and/or the secondary relays 36.

It is preferred that the controllers 12 monitor the machinery $M_1$-$M_3$ even with the controllers 12 being in the by-pass state.

The CPU's 16 of each of the controllers 12 may be operatively connected to the various components of the corresponding controller 12 including the starter relay 34, the secondary relays 36, the transmitter 40, the receiver 42, the module 58, the timer 60, the transducers 62, the memory 64, and the reader 70 so as to provide control thereover. The CPU's 16 may be modified to communicate with the machinery $M_1$-$M_3$ and/or the central networks 18 thereof. The machinery $M_1$-$M_3$ and/or the control networks 18 may be assigned unique IP addresses and added as part of the network of the system 10. Communication between the CPU's 16 and the machinery $M_1$-$M_3$/the control networks 18 may be conducted over hard wiring (e.g., the hardwired connection 55) and/or wirelessly. Various network protocols may be utilized, such as Modbus protocol.

Figure 4:
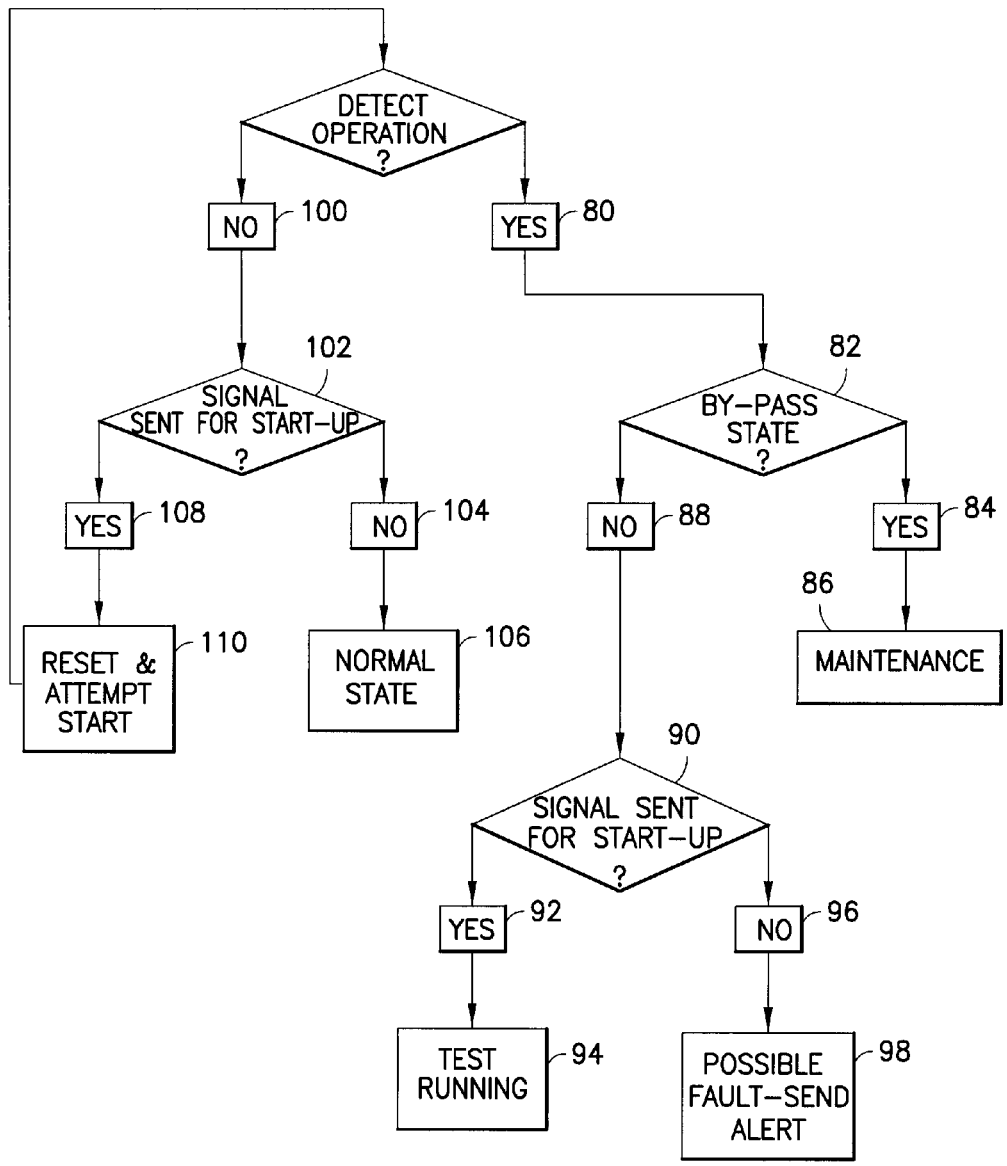

With reference to FIG. 4, and as described above, the controller 12 may detect different operating conditions of the corresponding piece of the machinery $M_1$-$M_3$ The corresponding piece of the machinery $M_1$-$M_3$ may be operating under different conditions, such as for a test, maintenance or normal operation. With operation of the corresponding piece of the machinery $M_1$-$M_3$ being detected (Box 80), the master server 14 and/or the CPU 16 may be checked to determine if the corresponding piece of the machinery $M_1$-$M_3$ is in the by-pass state (Box 82). As indicated above, a signal (e.g., the unique signal from the signal device 70) may have been transmitted to the master server 14 and/or the CPU 16 in entering the by-pass state. If the piece of the machinery $M_1$-$M_3$ is in the by-pass state (Box 84), and the piece of the machinery $M_1$-$M_3$ is in an operating mode, it may be concluded that maintenance of the piece of the machinery $M_1$-$M_3$ is being conducted (Box 86). If the piece of the machinery $M_1$-$M_3$ is not in the by-pass state (Box 88), the system 10 may be evaluated to determine if a signal was sent to the corresponding controller 12 to cause start-up of the piece of the machinery $M_1$-$M_3$ (Box 90). If so, it can be concluded that the machinery is being subjected to a test run under control of the system 10 (Boxes 92, 94). If no start signal had been sent in the system 10 (Box 96), the piece of the machinery $M_1$-$M_3$ may be operating under normal conditions, e.g., a generator caused to start due to power failure. It is possible that the piece of the machinery $M_1$-$M_3$ may be inadvertently caused to start, e.g., in the event of a transfer switch failure where the piece of the machinery $M_1$-$M_3$ is a generator. A fault notification may be sent to the operator of the corresponding piece of machinery $M_1$-$M_3$ as a courtesy notifying them of the operating status of the machinery (Box 98). In this manner, the operator may evaluate if the machinery is operating in normal fashion.

If no operation of the corresponding piece of machinery $M_1$-$M_3$ is detected (Box 100), it can be evaluated if a signal was sent to the controller to cause remote start-up (Box 102). If no signal was sent (Box 104), the corresponding piece of machinery $M_1$-$M_3$ is in a normal, non-operating state (Box 106). If a signal was sent (Box 108) and there was failure to start-up (e.g., no detection of output as described above), a reset may be attempted using one or more of the secondary relays 36 as described above (Box 110). Subsequently, a further attempt to remote start-up may be attempted with subsequent evaluation of operation.

The CPU's 16 of the various controllers 12 and/or the master server 14 may store information collected by the controllers 12 based on control and monitoring of the machinery $M_1$-$M_3$. The stored information may provide logs of the various pieces of the machinery $M_1$-$M_3$ including operating logs and service logs. The logs may be forwarded to service technicians to possibly assist in diagnosing a service problem. For example, a repeated fault detection may provide an indication of the source of a problem. The logs also may be forwarded to the operators 73 of the machinery $M_1$-$M_3$ as performance and maintenance records. The logs may be used to compare actual performance of the machinery $M_1$-$M_3$ with fuel consumption of the machinery $M_1$-$M_3$ to evaluate machine efficiency.

With the system 10, rounds by maintenance personnel may be minimized by conducting remote testing and monitoring of the machinery $M_1$-$M_3$. With typical procedures, a maintenance worker would travel on-site to the piece of machinery $M_1$-$M_3$ and conduct testing in person. With the system 10, the machinery $M_1$-$M_3$ may be tested remotely for fixed intervals of time, e.g., by using the timer 60, and caused to deactivate. Notifications of start-up and shut down may be sent by the master server 14 to the operator 73 of the corresponding piece of the machinery $M_1$-$M_3$. The system 10 provides an environmentally-friendly, "green" approach to periodic testing of the machinery $M_1$-$M_3$. By eliminating periodic testing by maintenance personnel, and relying on remote testing by the system 10, fuel consumption by maintenance workers is lessened with reduced rounds for maintenance personnel.

Under certain federal and local codes, such as NFPA 110, emergency generators must be checked and tested weekly. In addition, under other government codes, generator testing can not be conducted on days which have bad air quality. If such testing is conducted, fines may be imposed. With the system 10, air quality may be evaluated at a remote location with determination of whether or not remote start for testing purposes should be conducted. Air quality can be evaluated by visiting government web-sites. An operator of the master server 14 may evaluate air quality and determine optimal times for testing. The system 10 permits better compliance with air quality codes.

What is claimed is:

1. A system for remotely controlling and monitoring electrical generators, each respective electrical generator having a control network for control thereof, one or more switches coupled to the control network for controlling the respective electrical generator via the control network, said system comprising:

a controller hardwired coupled to the control network of the respective electrical generator, the controller being configured to control the respective electrical generator via the control network independently from, and simultaneously with, the switches, the controller being configured to monitor operation of the respective electrical generator;

means for receiving signals for controlling the controller from a remote location;

means for transmitting, to a remote location, information collected by the controller resulting from the controller monitoring operation of the respective electrical generator;

a central server configured to initiate the signals for controlling the controller; and a graphical user interface for interfacing with said central server, wherein the controller is selectively user by-passable, independent of the signals for controlling the controller, at the controller such that, in a by-passed state, said controller is prevented from controlling the respective electrical generator, and wherein, with the controller being in the by-passed state, said controller monitors operation of the respective electrical generator.

2. A system as in claim 1, further comprising a reader configured to detect a unique signal, wherein, with detection of the unique signal, the controller enters the by-passed state.

3. A system as in claim 1, wherein the controller is in the by-passed state for a predetermined period of time.

4. A system as in claim 3, further comprising a warning device, wherein, said warning device being configured to activate at a predetermined interval of time prior to the lapsing of the predetermined period of time for the by-passed state.

5. A system as in claim 4, wherein said warning device is a siren.

6. A system as in claim 4, wherein said warning device is a light.

7. A system as in claim 4, wherein said warning device is a speaker transmitting live or recorded messages.

8. A system as in claim 1, wherein said controller is configured to monitor one or more operational characteristics of the respective electrical generator.

9. A system as in claim 8, wherein said controller is configured to monitor temperature at one or more locations of the respective electrical generator.

10. A system as in claim 1, wherein the switches are located on-site with the respective electrical generator.

11. A system as in claim 1, wherein said central server is configured to receive the information collected by said controller resulting from said controller monitoring operation of the respective electrical generator.

12. A system as in claim 1, further comprising a reader configured to detect a unique signal, wherein, with detection of the unique signal, said means for transmitting signals transmits a signal.

13. A system as in claim 12, wherein the unique signal is generated by a RFID device.

14. A system as in claim 12, wherein the unique signal is generated by a direct contact transmitter.

* * * * *